THREE PHASE INPUT

THREE PHASE INPUT

INVENTOR.
KARL LENNART GREES
SVEN OLOF KARLSSON
BY

United States Patent Office 3,462,619
Patented Aug. 19, 1969

3,462,619
HOLDING CIRCUIT FOR AN ALTERNATING
CURRENT STATIC SWITCH
Karl Lennart Grees, Irsta, and Sven Olof Karlsson,
Vasteras, Sweden, assignors to Allmänna Svenska
Elektriska Aktiebolaget, Vasteras, Sweden, a Swedish
corporation
Filed June 18, 1965, Ser. No. 465,047
Claims priority, application Sweden, July 1, 1964,
7,987/64
Int. Cl. H03k 17/28
U.S. Cl. 307—252                                    1 Claim

ABSTRACT OF THE DISCLOSURE

A three-pole AC static switch comprises in each pole two reverse-parallel-connected rectifiers, one of which is a thyristor controlled by a firing circuit. To operate the switch, it is provided with one momentarily operated on-contact, for example a push button, and one similar off-contact. Self-holding of the switch is provided by connecting the firing circuit so that current is supplied to the firing circuit only when the thyristors are in the on-state.

The present invention relates to a static switch for alternating current comprising at least two reverse-parallel-connected semi-conductor rectifiers, of which at least one is a thyristor. When a switch of this type is in the closed position, the thyristor must be fed with a firing pulse at the beginning of each half cycle during which it is to conduct. This is brought about by means of a firing circuit connected to the gate electrode of the thyristor. It is often desirable to be able to energize this firing circuit and accordingly close the thyristor switch by momentarily closing a contact device and turn off the switch by momentarily opening another contact device. Special circuits for this purpose, so-called holding circuits, are known in connection with conventional relays and contactors, but these circuits cannot be used for thyristor switches.

Accordingly, the primary object of the present invention is to provide a novel thyristor switch with a simple operating circuit of the above mentioned type. A static switch according to the invention is characterized by said firing circuit being connected to the A.C. network only on the load side of the switch so that electric power is supplied to the firing circuit when the controllable rectifier is in the on-state. By connecting the firing circuit to the A.C. network in this way and thereby supplying it with feeding voltage through the main contact of the static switch, the result is achieved that no extra contact device is required for effecting self-holding of the static switch and consequently its holding circuit becomes particularly simple.

To close the switch, a firing pulse must be fed to the gate electrode of the thyristor, which for example can be effected by means of a separate voltage supply. However, the switch becomes considerably simpler and cheaper if the closing is carried out by means of a push-button or the like arranged in a connection between the firing circuit and the supply side of the switch.

Figure 1:
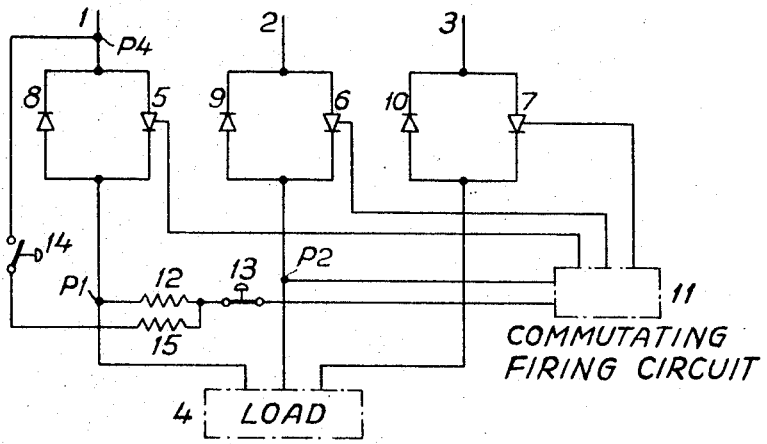
Figure 2:
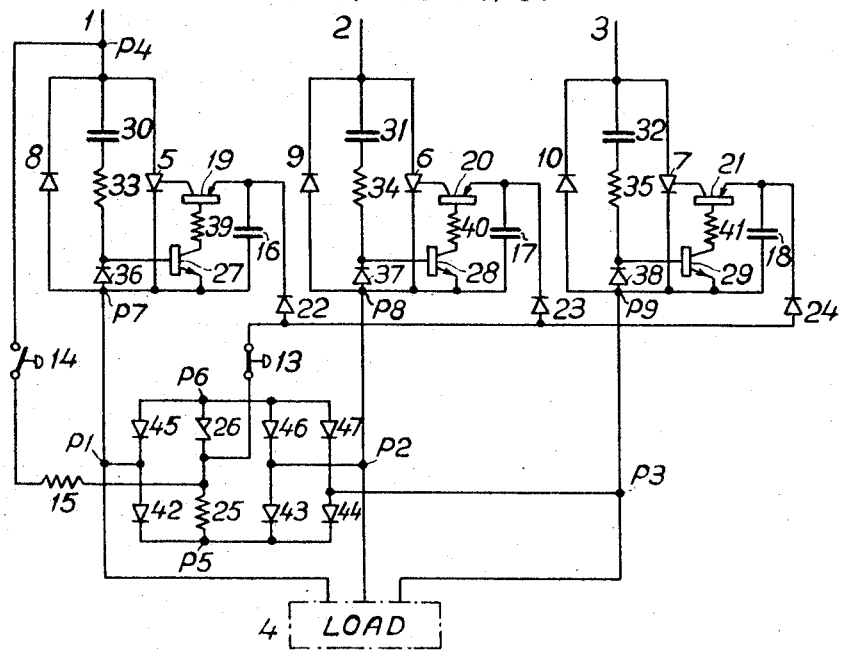

The invention will be described below with reference to the accompanying drawing, in which FIG. 1 shows the principle of a static switch according to the invention and FIG. 2 shows a detailed connection diagram of a three-phase static switch manufactured according to this principle.

In FIG. 1, the numerals 1, 2 and 3 designate the three phase conductors in a three-phase system which are connected to a load impedance 4 through a three-pole static switch. Each pole of the switch consists of a switching unit containing two reverse-parallel-connected semi-conductor rectifiers, of which the one is a thyristor 5, 6, 7 and the other a non-controllable semi-conductor diode 8, 9, 10. When the static switch is closed, the thyristors 5, 6 and 7 must be supplied with a firing pulse at the beginning of each half cycle during which they are to conduct. This is brought about by means of a firing device 11, which, when it is supplied with feeding voltage, sends firing pulses to the gate electrodes of the thyristors. The feeding voltage to the firing device 11 is taken out by a resistor 12 and a turn-off contact device 13 from the points P1 and P2 in the phases 1 and 2 on the load side of the switch. Besides, by means of the closing contact device 14, the switching unit in phase 1 can be bridged over so that the feeding conductor of the firing device which is connected to the point P1 also is connected by the resistor 15 to the point P4 on the supply side of the switch. When the switch is turned off, i.e. the thyristors are in their blocking state, the points P1 and P2 will be at one and the same potential, and accordingly the firing device 11 is not supplied with feeding voltage and no gate pulses are produced. If the contact 14 is now closed for a short period, the firing device 11 will be supplied with weeding voltage and accordingly the thyristors 5, 6 and 7 in their turn receive firing pulses. The static switch is thereby closed and this causes the firing device 11 also to be supplied with feeding voltage even when the contact 14 is opened.

The static switch is turned off by the contact device 13 being opened, so that the firing device 11 is not supplied with feeding voltage and the firing pulses to the thyristors cease. The points P1 and P2 thereby again get the same potential and the contact device 13 can again be closed without the static switch being closed. The resistors 12 and 15 limit the current which flows through the contact device 14 when this is kept closed.

In FIG. 2 is shown a connection diagram for a static switch manufactured according to the invention, where most of the circuit elements which are shown in FIG. 1 can be found. Instead of the firing device 11 a detailed firing circuit is however shown in FIG. 2, whose method of functioning will be further clarified.

Capacitors 16, 17, 18 are connnected over transistors 19, 20, 21 of the PNP type respectively between the gate electrode and cathode of each of the thyristors 5, 6 and 7. For charging the capacitors 16, 17 and 18, each of these capacitors is connected over a diode 22, 23, 24 and the turn-off contact device 13 to an intermediate terminal of a voltage divider consisting of a resistor 25 and a Zener diode 26. The voltage divider is fed from a three-phase Graetz bridge 42–47, whose A.C. side is connected to the phase conductors 1, 2 and 3 at the points P1, P2 and P3 on the load side of the static switch. The intermediate terminal of the voltage divider can also be connected by means of the closing contact device 14 across the resistor 15 to phase 1 at the point P4 on the supply side of the switch. Transistors 27, 28, 29 of the PNP type are arranged for controlling the transistors 19, 20 and 21, and these in their turn are controlled by means of a branch conductor lying parallel to each of the thyristors 5, 6 and 7, and consisting of a series connection of an auxiliary capacitor 30, 31, 32, a resistor 33, 34, 35 and a diode 36, 37, 38. In the control circuit of each of the transistors 19, 20 and 21, a resistor 39, 40, 41 is arranged. As can be seen from the diagram, the switching units for the different poles of the static switch are identical, so that only the method of functioning for the arrangement belonging to phase 1 will be described in the following.

When the static switch is closed, the point P5 will be at the same potential as that one of the phase conductors 1, 2 and 3, which at the moment is at the highest potential by means of the diodes 42, 43 and 44 in the three-phase Graetz bridge. By means of the diodes 45, 46 and 47 in the same bridge, the point P6 in a similar way will be at the lowest potential of these phases. The capacitors 16, 17 and 18 will thereby be charged to a voltage corresponding to the Zener voltage of the Zener diode 26 and with plus potential on the upper plates of the capacitors.

If now for example the voltage is such that the thyristor 5 will fire, the transistor 27 will be fed by control current over the auxiliary capacitor 30 and the resistor 33. Accordingly, the transistor 19 also is supplied with control current over the limiting resistor 39 from the charged capacitor 16 which thereby also delivers the energy necessary for the firing of the thyristor 5. When the auxiliary capacitor 30 is recharged with inverse polarity to a voltage corresponding to the forward voltage drop of the thyristor 5, the transistor 27 does not receive any control current during the remaining part of the half cycle when the thyristor 5 is to conduct, so that the transistor 19 blocks further discharging of the capacitor 16. The firing current delivered from the capacitor 16 then takes the form of a short circuit pulse at the beginning of the half cycle in question. The diode 22 prevents the capacitor 16 from being discharged over the switching units in the remaining phases.

The static switch is closed by the contact device 14 being closed for a short period. When the potential in one of the points P7, P8 and P9 is thereby lower than the potential in the point P4, the associated capacitor 16, 17, 18 is charged so that sufficient energy will be available for the firing of thyristor 5, 6, 7 when transistor 27, 28, 29 receives control current. As soon as any of the thyristors 5, 6 and 7 have been fired, the capacitors 16, 17 and 18 can be charged from the three-phase Graetz bridge 42–47.

The static switch can also be closed by, for example, the capacitor 16 being charged with plus potential on its upper plate by a current pulse being fed to the capacitor from a separate current supply, not shown.

The current switch is turned off by the contact device 13 being opened, so that the capacitors 16, 17 and 18 no longer receive charging current. The contact device 13 can be a conventional contact, a transistor which is blocked for a moment, or the like.

What is claimed is:
1. A three-pole alternating current static switch for a three-phase electric network having a supply side and a load side, each pole of said switch comprising two solid state reverse-parallel-connected rectifiers, one of said rectifiers having a gate electrode for discontinuous control thereof, three first and second control devices, a firing circuit for said controllable rectifier connected to each of said gate electrodes, through said first and second control devices for turning said switch on and off, respectively, three-parallel-connected recifier means each poled in the same direction as said rectifiers without the gate electrodes for respectively connecting said firing circuit to said alternating current network on the load side only of and resistance-capacitance-switch, said connecting means connected in parallel with said reverse-parallel-connected rectifiers for supplying electric power to said firing circuit through said parallel-connected rectifier means when said controllable rectifiers are in the on-state, said first control device comprising a switching device connected between said firing circuit and the supply side of said switch.

References Cited

UNITED STATES PATENTS

| | | | |
|---|---|---|---|
| 3,075,136 | 1/1963 | Jones | 307—284 |
| 3,239,691 | 3/1966 | Koeffler | 307—252 |
| 3,300,656 | 1/1967 | Meier et al. | 307—297 |
| 3,407,314 | 10/1968 | Wolff | 307—252 X |

JOHN S. HEYMAN, Primary Examiner

U.S. Cl. X.R.

307—284